March 23, 1965 M. J. HARNISH ETAL 3,174,350
COMBINATION CLUTCH AND BRAKE UNIT
Filed April 17, 1962 3 Sheets-Sheet 1
FIG. 1.
FIG. 3.
FIG. 4.
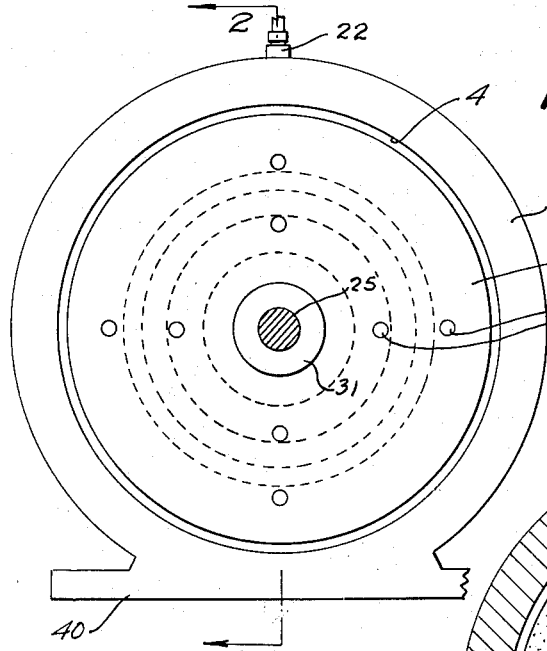
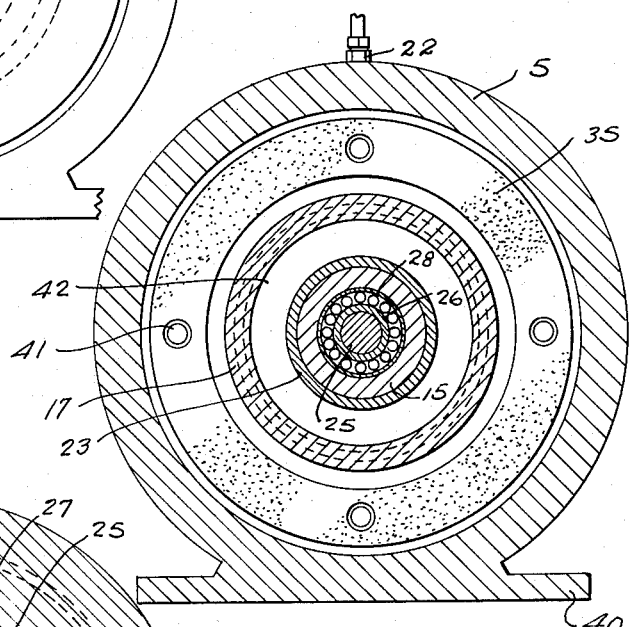
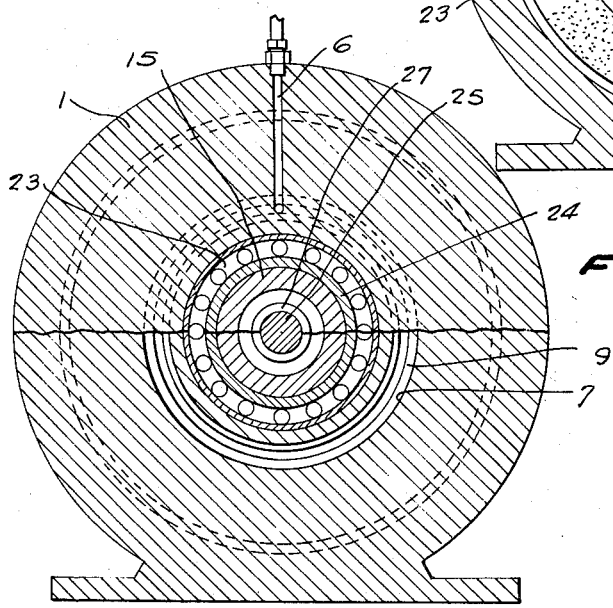
INVENTORS
MARTIN T. HARNISH,
ROY E. MILLER.
BY
Linton and Linton
ATTORNEYS.

March 23, 1965 M. J. HARNISH ETAL 3,174,350
COMBINATION CLUTCH AND BRAKE UNIT
Filed April 17, 1962 3 Sheets-Sheet 2

INVENTORS.
MARTIN T. HARNISH,
ROY E. MILLER,
BY
ATTORNEYS.

March 23, 1965   M. J. HARNISH ETAL   3,174,350
COMBINATION CLUTCH AND BRAKE UNIT
Filed April 17, 1962   3 Sheets-Sheet 3
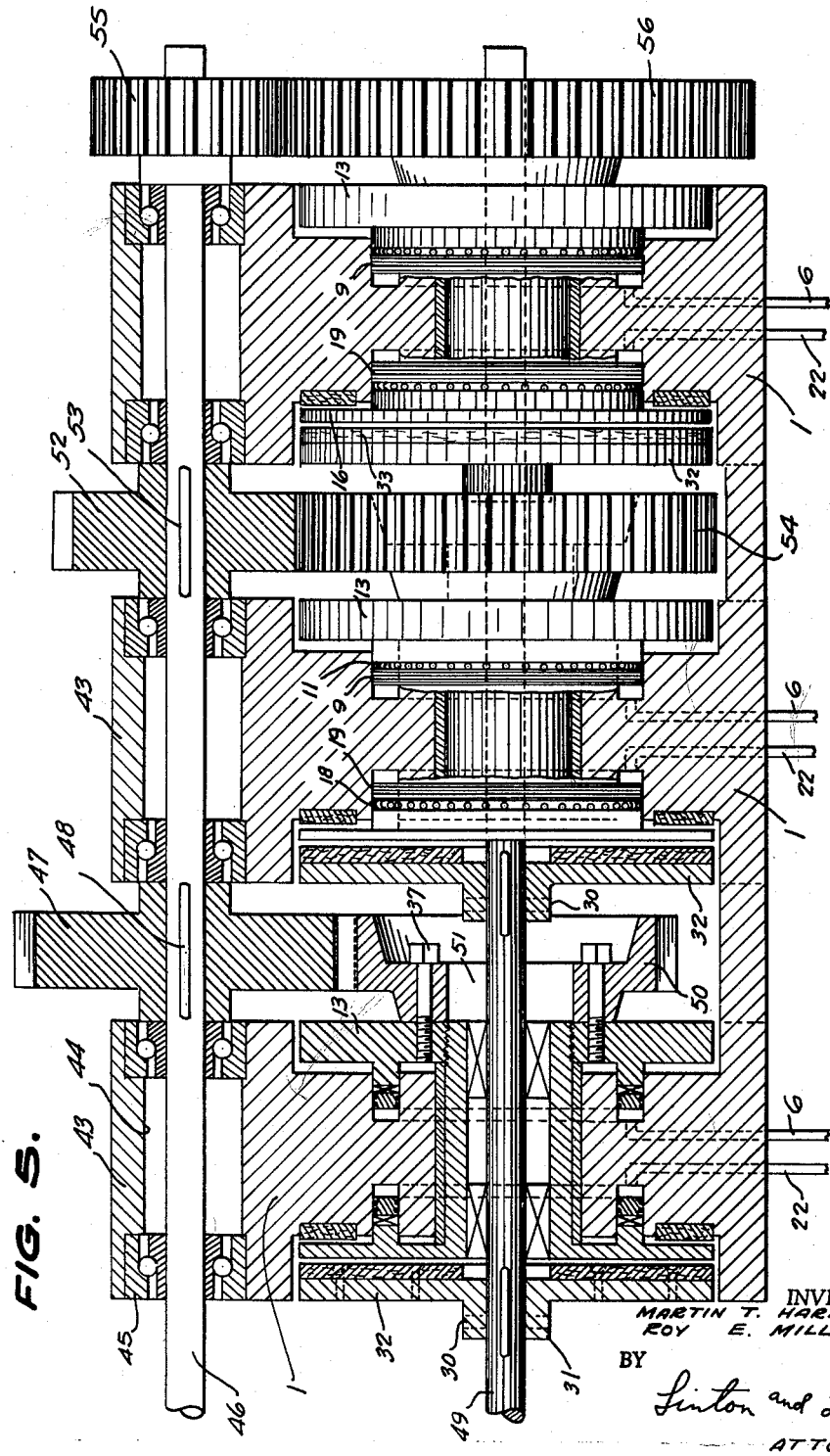
FIG. 5.
INVENTORS.
MARTIN T. HARNISH,
ROY E. MILLER,
BY
ATTORNEYS.

United States Patent Office 3,174,350
Patented Mar. 23, 1965

3,174,350
COMBINATION CLUTCH AND BRAKE UNIT
Martin J. Harnish, Carlisle, and Roy E. Miller, Mechanicsburg, Pa., assignors to General Automated Machinery Corporation, Carlisle, Pa.
Filed Apr. 17, 1962, Ser. No. 188,073
10 Claims. (Cl. 74—375)

The present invention relates to a combination clutch and brake unit and is more particularly concerned with such a unit to be operated by a media under pressure, such as a gas or fluid, for coupling an input element to an output element or stopping one element.

The principal object of the present invention is to provide in one unitary unit a clutch and brake selectively controlled by the introduction of a media under pressure therein for giving an immediate driving motion or braking action to an output element as desired as well as providing a variable speed or torque to said output element.

Another and important object of the invention is to provide a combination clutch and brake unit of a rugged, but economically produceable construction that is positive in operation, will have a long life and can be quickly and readily connected to various types of driving means, output elements, auxiliary elements as well as in combination with similar clutch and brake units to provide variable speed transmissions.

Another important object of the invention is to provide a brake and clutch unit which is compact requiring a minimum amount of space and can be readily assembled or disassembled without requiring special skill or tools while permitting various types of output elements to be quickly and easily connected thereto.

Further objects of the invention will be in part obvious and in part pointed out in the following detailed description of the accompanying drawings in which:

FIGURE 1 is an end view of the present device taken on line 1—1 of FIGURE 2.

FIGURE 3 is a cross-sectional view taken on line 3—3 of FIGURE 2.

FIGURE 4 is a cross-sectional view taken on line 4—4 of FIGURE 2.

FIGURE 5 is a longitudinal sectional view of a variable speed transmission utilizing a series of the present clutch and brake units.

Figure 2:
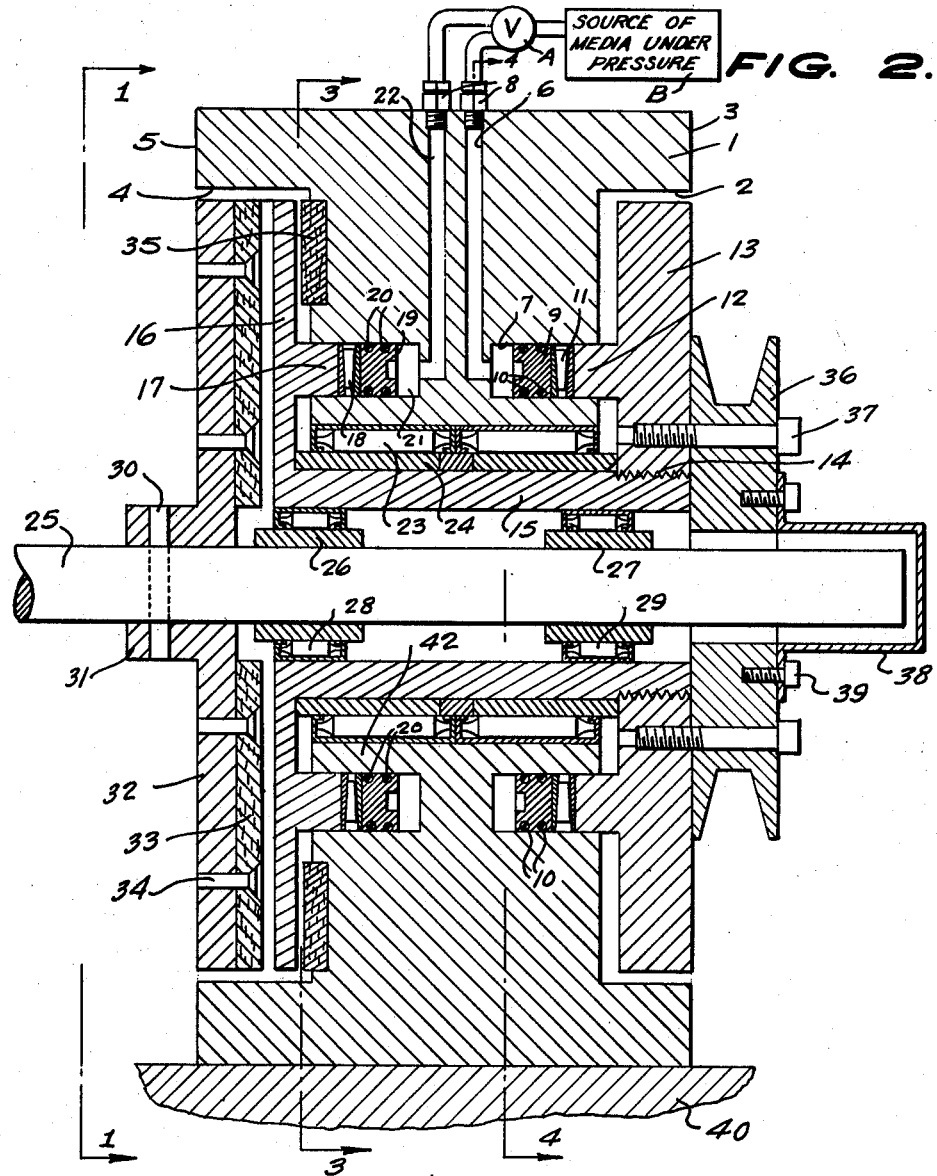
FIGURE 2 is a cross-sectional view taken on line 2—2 of FIGURE 1.

Referring now more particularly to the accompanying drawings in which like and corresponding parts are designated by similar reference characters, numeral 1 indicates a housing having an annular recess 2 in end face 3 and a similar annular recess 4 in the opposite end face 5.

A channel 6 extends inwardly from the periphery of said housing to a ring shaped cylinder 7 provided in said housing and opening into recess 2. A pipe or hose connector 8 is joined to said housing in communication with said channel.

A ring piston 9 has rubber or metal O rings 10 recessed in the periphery and bore wall thereof providing piston rings therefor. Said ring piston with O rings is slideably mounted within cylinder 7 with said O rings bearing against the walls of said cylinder providing a seal between piston and cylinder.

A ring shaped thrust bearing 11 is also slideably mounted within cylinder 7 while a ring shaped projection 12 of plate 13 slideably extends in said recess against said thrust bearing.

Plate 13 has a threaded central bore 14 in threaded engagement with one end of tube 15 whose other end carries a ring shaped plate 16 integral therewith or fixedly connected thereto.

Plate 16 has a ring shaped projection 17 extending normal thereto into a ring shaped cylinder 21 against a ring shaped thrust bearing 18 slideably positioned in cylinder 21. A ring shaped piston 19 is also slideably positioned in cylinder 21 on the opposite side of said thrust bearing 18 to said projection 17.

Piston 19 also has rubber or metal O rings 20 recessed in the periphery and bore wall thereof bearing against the walls of cylinder 21 forming a seal between said piston 19 and cylinder 21.

A channel 22 extends from cylinder 21 to the periphery of housing 1 at which point a second pipe or hose connector 8 is connected thereto. Said connectors 8 are each connected to a control valve A and source of media B, such as air or a fluid, under pressure.

A roller bearing 23 surrounds a tube 24 which in turn surrounds tube 15. Wall 42 defining an axial bore in housing 1 surrounds said roller bearing.

A pair of tubes 26 and 27 have shaft 25 extending therethrough while roller bearings 28 and 29 surround tubes 26 and 27 respectively and bear against tube 15.

A taper pin 30 extends through hub 31 of an annular plate 32 and through shaft 25 also extending through said plate 32 fixedly connecting shaft 25 to plate 32.

A ring shaped friction disc 33, preferably formed of a suitable friction type material such as, for example only, material known in the trade as 2320K sold by the Raybestos Manhattan Corp., of Manheim, Pennsylvania, is fixedly mounted on the inner face of plate 32 by rivets 34 facing plate 16.

A ring pulley 36 is fixedly attached to plate 13 by bolts 37 while a cover 38 is attached to said pulley by bolts 39. Shaft 25 extends through said pulley and by removing cover 38 can be connected to any element which it is desired to have driven thereby.

In the operation of the present device, shaft 25 or pulley 36 is connected to a source of motive power, not shown, such as a motor, engine or the like or shaft 25 may be the drive shaft of such motor or engine. Housing 1 is held from movement by having its base 40 fixedly connected to a support or said housing may be fixedly connected in any conventional manner to other means such as the driving motor or engine or in other manners known in the art.

For example, if shaft 25 is the driving element an operator by controlling valve A can introduce air or fluid under pressure into channels 6 or 22 for driving or stopping pulley 36 as desired when shaft 25 is rotating. If the pressurized media enters channel 6, piston 9 is moved to the right of FIGURE 2 pushing thrust bearing 11, projection 12, plate 13, tube 15, and plate 16 also to the right bringing plate 16 against disc 35 held fixed by housing 1 so that pulley 36 is held fast or stopped immediately if rotating by the frictional engagement.

By initially introducing the pressurized media to channel 22 or after releasing the pressure in channel 6 piston 19 is moved to the left of FIGURE 2 pushing thrust bearing 18, projection 17 and plate 16 therewith until plate 16 engages rotating disc 33 whereupon plate 16, tube 15, plate 13 and pulley 36 are caused to immediately rotate with shaft 25. However the speed of pulley 36 can be varied by varying the amount of pressure in channel 22. That is, a relatively light amount of media will permit slippage between plate 16 and disc 33 so that pulley 36 would not rotate as fast as shaft 25. Increasing the pressure in channel 22 will increase the engagement of plate 16 with disc 33 until pulley 36 is rotating at the same speed as shaft 25.

Releasing the pressure in channel 22 would disconnect pulley 36 from shaft 25 so that they can idle or by then sending the media into channel 6 the pulley would be immediately stopped.

In FIGURE 5 there is shown a variable speed transmission incorporating a series of the present clutch and brake units in a slightly modified form.

That is three housings 1 of the present clutch and brake unit are placed side by side in line and can be one integral housing as shown. Further each housing has a bearing projection 43 with a bore 44 containing bearings 45 supporting a jack shaft 46 extending through all of said housings.

A shaft 49 replaces shaft 25 and extends through all of said housing tubes 15 and central openings 51 in each of the spur gears 50, 54 and 56.

A pinion 47 is fixed to shaft 46 by key 48 and meshes with spur gear 50 replacing pulley 36 and attached by bolts 37 to plate 13. Pinion 47 and spur gear 50 are thus postitioned between the left and middle housing 1.

A pinion 52 is fixed to shaft 46 by key 53 and meshes with spur gear 54 fixed to plate 13 of the middle housing 1.

A third pinion 55 is fixed on the shaft 46 and meshes with spur gear 56 attached to plate 13 of the right hand unit.

Said pinions and spur gears can be of various gear ratios as desired and as many of the present units with accompanying pinion and spur gears can be employed as required.

Either shaft 49 or 46 can be connected to a source of motive power for driving the same and the other shaft the output element.

Media can be introduced by means, automatic or manual, not shown, to anyone of the channels 6 or 22 to vary the speed of the output shaft or to stop the same. Supplying the media to one, two or three of the channels 6 or any group thereof will immediately create a braking action on shaft 46. With said pressure released, supplying the media to one of the channels 22 will connect the spur gear 50, 54 or 56 of the unit so activated to shaft 49 imparting the gear ratio between the spur gear so coupled with its meshing pinion 47, 52 or 55 to the shafts 46 and 49.

The introduction of media to channels 6 and 22 of the units of FIGURES 2 and 5 can be manually operated means or by automatic means whereby a set sequence of operations can be obtained.

Figure 6:
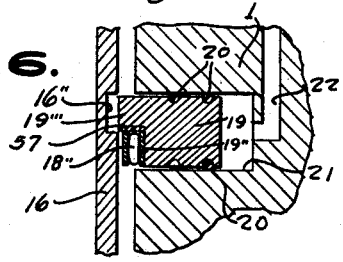
FIGURE 6 is an enlarged cross-sectional view of a modified form of the piston and plate usable with the present device.

FIGURE 6 is an enlarged cross-sectional view of a modified form of piston and plate moveable thereby. The ring shaped piston 19' surrounded by O rings 20 and slideable in cylinder 21 has an annular recess 19" in the outer end thereof providing an annular extension 19''' on said end. A thrust bearing 18" is mounted in recess 19" for bearing against plate 16' which in turn has an annular recess 16" instead of projection 17 for receiving extension 19'''. An annular plastic retainer 57 for bearing 18" is mounted in recess 19" and keeps said bearing against piston 19'. There results a piston 19' which has a larger end area than said bearing.

Piston 19' and plate 16' can be substituted for either pistons 9 or 19 and plates 13 and 16 in the unit previously described.

The devices shown are capable of considerable modification and such changes thereto as come within the scope of the appended claims is deemed to be a part thereof.

We claim:

1. A combination clutch and brake unit comprising at least one fixed housing having a central bore, said housing having opposite ends with at least one ring-shaped cylinder in each end thereof for selective connection to a source of media under pressure, a ring-shaped piston slideably mounted in each of said cylinders, a pair of connected plates each being movable by one of said pistons and rotatably and slideably supported by said housing, a shaft rotatably supported by said housing, a carrying plate fixedly connected to said shaft for rotation therewith and having the friction disc thereon facing one side of one of said plates for being engaged thereby upon actuation of one of said pistons coupling said plates to said shaft, a second friction disc mounted on said housing facing the opposite side of one of said plates for being engaged thereby upon actuation of the other of said pistons for stopping the rotation of said plates.

2. A combination clutch and brake unit comprising a fixed housing having recessed opposite ends and a central bore, a shaft extending through said bore, a friction disc carrying plate fixedly mounted on said shaft, a second friction disc fixedly mounted on said housing within one of said recesses, a second plate positioned between said discs, a third plate positioned within the other of said recesses, means rotatively and slideably supported in said housing bore connecting said second and third plates, a pair of ring-shaped cylinders each opening into one of said recesses and being capable of connection to a source of pressurized media, a pair of ring-shaped pistons slideably mounted in said cylinders and each being capable of engaging and moving said second and third plates in opposite directions.

3. A combination clutch and brake unit as claimed in claim 2 wherein O rings are mounted upon the peripheral and bore walls of said pistons bearing against the wall of their respective cylinder providing a seal between the piston and cylinder.

4. A combination clutch and brake unit as claimed in claim 2 wherein means is provided for detachably connecting a driven element to said third plate.

5. A combination clutch and brake unit comprising a housing having recessed opposite ends and an axial bore, means for retaining said housing in a fixed position, a plate having a bore and positioned in one of said recesses, a second plate having a bore and positioned in the other of said recesses, a third plate having a bore and positioned in said other recess, a tube slideably and rotatably mounted through said housing axial bore and connecting said first and second plates, a shaft extending through the bore of said plates and through said tube, said shaft being fixedly connected to said third plate, means rotatably supporting said shaft in said tube, a pair of ring-shaped cylinders provided in said housing each opening within one of said recesses, a pair of ring-shaped pistons each slideably mounted in one of said cylinders, means carried by said first and second plates for being engaged by said pistons for moving said plates in opposite directions, a friction disc carried by said third plate facing one side of said second plate, a second friction disc mounted on said housing facing the other side of said second plate and means for introducing pressurized media to either cylinder.

6. A combination clutch and brake unit as claimed in claim 5 wherein a pair of ring-shaped thrust bearings are each slideably positioned in one of said cylinders between the piston therein and the piston engaging means of said plates.

7. A combination clutch and brake unit as claimed in claim 5 wherein said shaft supporting means consists of roller bearings positioned between said shaft and said tube and also roller bearings are positioned between said tube and the wall of said housing bore rotatably supporting said tube.

8. A variable speed transmission comprising a series of fixed housings, each of said housings having an axial bore with said bores of all the housings extending in line, a shaft extending through said housing bore, means rotatably supporting said shaft in said housing bores, a plurality of plates each rotatably and slideably supported on one of said housings, friction discs fixedly mounted on said housings, friction disc carrying plates fixedly mounted on said shaft each adjacent one of said plurality of plates, means carried by each housing for moving the plate of said housing against the friction disc on said housing for braking said plate or against the friction disc carrying plate adjacent thereto connecting the same to said shaft as desired, a second shaft rotatably supported by said housings, pinions of various sizes fixedly carried by said second shaft and spur gears of various sizes each connected to one of said plates and meshing with one of said pinions.

9. A variable speed transmission comprising a series of fixed housings each having recessed opposite ends and axial bores with the bores of all housings extending in line, a shaft extending through said housing bores, means rotatably supporting said shaft in said housing bores, a plurality of plates each mounted in one of said housing recesses, a second plurality of plates each mounted in another one of said housing recesses and connected to the one of the first of said plates mounted in its respective housing, a plurality of friction disc carrying plates fixedly connected to said shaft and each facing one of said second plates, friction discs fixedly carried by said housings and each facing one of said second plates, means for moving said first and second plates in opposite directions, a second shaft rotatably supported by said housings, a plurality of gear trains each of a different gear ratio and connecting one of said first-mentioned plates with said second shaft.

10. A combination clutch and brake unit as claimed in claim 2 wherein said second and third plates each having an annular recess, said pistons each have an end extension for entering the recess of their respective plate and a recess in said end, a thrust bearing mounted in said piston recesses for bearing against their respective plate and a retainer ring mounted in each piston recess for retaining the thrust bearing therein.

References Cited by the Examiner
UNITED STATES PATENTS 2,242,396   5/41   Johansen _____ 192—18

DON A. WAITE, *Primary Examiner.*